(12) United States Patent
Uliyar et al.

(10) Patent No.: US 10,275,669 B2
(45) Date of Patent: Apr. 30, 2019

(54) SYSTEM AND METHOD FOR DETECTING OBJECTS IN AN AUTOMOTIVE ENVIRONMENT

(71) Applicant: Lightmetrics Technologies Pvt. Ltd., Bangalore (IN)

(72) Inventors: Mithun Uliyar, Bangalore (IN); Gururaj Putraya, Bangalore (IN); Soumik Ukil, Bangalore (IN); Krishna A G, Bangalore (IN); Ravi Shenoy, Bangalore (IN); Pushkar Patwardhan, Bangalore (IN)

(73) Assignee: Lightmetrics Technologies PVT. LTD., Bangalore (IN)

( * ) Notice: Subject to any disclaimer, the term of this patent is extended or adjusted under 35 U.S.C. 154(b) by 0 days.

(21) Appl. No.: 15/526,748

(22) PCT Filed: Sep. 8, 2016

(86) PCT No.: PCT/IB2016/055360
§ 371 (c)(1),
(2) Date: May 12, 2017

(87) PCT Pub. No.: WO2017/042710
PCT Pub. Date: Mar. 16, 2017

(65) Prior Publication Data
US 2017/0337435 A1   Nov. 23, 2017

(30) Foreign Application Priority Data

Sep. 9, 2015   (IN) .......................... 4783/CHE/2015

(51) Int. Cl.
*G06K 9/00* (2006.01)
*G06K 9/20* (2006.01)
(Continued)

(52) U.S. Cl.
CPC ......... *G06K 9/00805* (2013.01); *B60W 40/04* (2013.01); *B60W 40/08* (2013.01);
(Continued)

(58) Field of Classification Search
None
See application file for complete search history.

(56) References Cited

U.S. PATENT DOCUMENTS 7,095,786 B1 † 8/2006 Schonfeld
7,764,808 B2 † 7/2010 Zhu
(Continued)

FOREIGN PATENT DOCUMENTS

EP    2833325 A1 *  2/2015

OTHER PUBLICATIONS

Mubashir Ahsan et al., Autonomous Ground Vehicle, Publication Date: 2013, International Journal of Technology and Research; Islamabad vol. 1, 96-101.†

Primary Examiner — Matthew C Bella
Assistant Examiner — Jose Torres
(74) Attorney, Agent, or Firm — North Shore Patents, P.C.; Michele Liu Baillie

(57) ABSTRACT

Advanced driver assistance systems (ADAS) and methods for object detection such as traffic lights, speed signs, in an automotive environment, are disclosed. In an embodiment, ADAS includes camera system for capturing image frames of at least a part of surroundings of vehicle, memory comprising image processing instructions and processing system for detecting one or more objects in a coarse detection followed by a fine detection. Coarse detection includes detecting presence of the one or more objects in non-consecutive image frames of the image frames, where non-consecutive image frames are determined by skipping one or more frames of the image frames. Upon detection of pres-
(Continued)

ence of the one or more objects in coarse detection, fine detection of the one or more objects is performed in a predetermined number of neighboring image frames of a frame in which the presence of the objects is detected in coarse detection.

18 Claims, 8 Drawing Sheets

(51) Int. Cl.

| | |
|---|---|
| *G06K 9/62* | (2006.01) |
| *G06K 9/68* | (2006.01) |
| *G06K 9/78* | (2006.01) |
| *B60W 40/04* | (2006.01) |
| *B60W 40/08* | (2012.01) |
| *G01C 11/04* | (2006.01) |
| *G08G 1/01* | (2006.01) |
| *G08G 1/04* | (2006.01) |
| *G08G 1/052* | (2006.01) |
| *G08G 1/0967* | (2006.01) |
| *G06T 7/254* | (2017.01) |
| *B60R 1/00* | (2006.01) |

(52) U.S. Cl.
CPC .......... *G01C 11/04* (2013.01); *G06K 9/00711* (2013.01); *G06K 9/00818* (2013.01); *G06K 9/00825* (2013.01); *G06K 9/2054* (2013.01); *G06K 9/6277* (2013.01); *G06K 9/6857* (2013.01); *G06K 9/78* (2013.01); *G06T 7/254* (2017.01); *G08G 1/0129* (2013.01); *G08G 1/04* (2013.01); *G08G 1/052* (2013.01); *G08G 1/096783* (2013.01); *B60R 1/00* (2013.01); *B60R 2300/302* (2013.01); *G06T 2207/30261* (2013.01)

(56) References Cited

U.S. PATENT DOCUMENTS

| | | | | |
|---|---|---|---|---|
| 2010/0328055 | A1* | 12/2010 | Fong | B60Q 9/005 340/425.5 |
| 2013/0049988 | A1* | 2/2013 | Roeber | G08G 1/09623 340/905 |
| 2014/0063232 | A1* | 3/2014 | Fairfield | G06K 9/78 348/118 |
| 2015/0278615 | A1* | 10/2015 | Ogawa | G06K 9/00818 348/148 |
| 2016/0301923 | A1* | 10/2016 | Ichige | H04N 5/23229 |
| 2017/0161569 | A1† | 6/2017 | Ren et al. | |

\* cited by examiner
† cited by third party

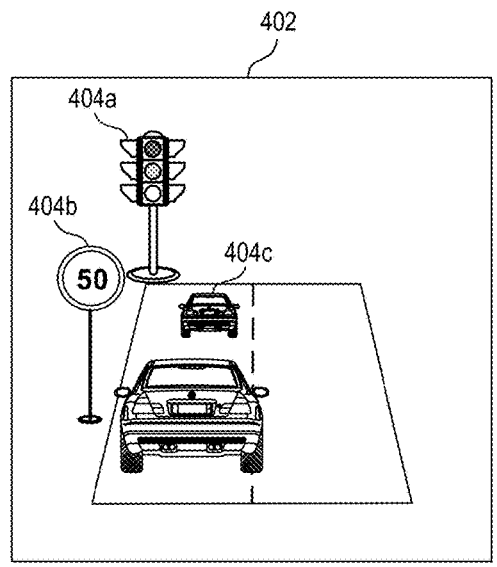 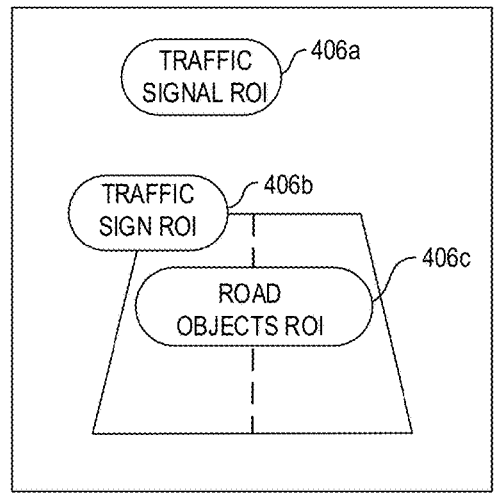
FIG. 4A                    FIG. 4B
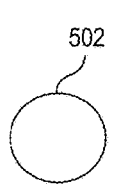 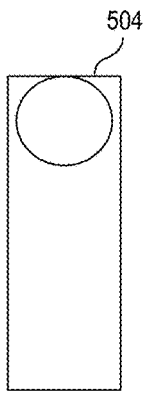 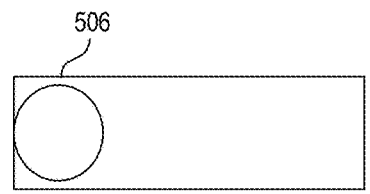
RED BLOB OF SIZE        VERTICAL RED SIGNAL      HORIZONTAL RED
W X W PIXELS            OF SIZE 3W X W           SIGNAL OF SIZE W X 3W
FIG. 5

SYSTEM AND METHOD FOR DETECTING OBJECTS IN AN AUTOMOTIVE ENVIRONMENT

FIELD OF THE INVENTION

The present invention generally relates to computer vision algorithms and, more particularly to systems and methods for detecting objects in automotive environments using computer vision algorithms.

BACKGROUND TO THE INVENTION

Advanced Driver Assistance Systems (ADAS) installed in vehicles are useful for detecting objects such as other vehicles, pedestrians, traffic lights and signs in front of the vehicles, and generate alerts for the driver. Such systems are also useful in detecting various traffic situations including traffic jam, construction work, etc on the road and alert the driver regarding the same. A typical ADAS includes a camera placed on the dashboard of a vehicle for capturing images/videos of various events/objects in front of the vehicle, and a processing unit connected to the camera for executing multiple computer vision algorithms such as vehicle detection, pedestrian detection, traffic sign detection etc.

However, the complexity of the processing unit increases, when the multiple computer vision algorithms are executed concurrently for detecting one or more objects, or one or more events. Therefore, these computer vision algorithms need to be very efficient in executing the computationally complex object detection and scene analysis algorithms. The processing units are generally constrained in their computation and memory requirements. Therefore, running such multiple computer vision algorithms on such constrained devices is a challenging task.

SUMMARY

Various methods and systems are provided for object detection in an automotive environment. In an embodiment, an advanced driver assistance system (ADAS) includes a camera system, a memory and a processing system. The camera system captures image frames of at least a part of surroundings of a vehicle. The memory includes image processing instructions. The processing system is communicably coupled to the camera system for receiving the image frames. The processing system is configured to alongwith the image processing instructions stored in the memory to cause the ADAS to perform a coarse detection and a fine detection for detecting one or more objects. The coarse detection of the one or more objects is performed by detecting presence of the one or more objects in non-consecutive image frames of the image frames, where the non-consecutive image frames are determined by skipping one or more image frames of the image frames. Upon detection of the presence of the one or more objects in the coarse detection, the fine detection of the one or more objects is performed in at least a predetermined number of neighboring image frames of an image frame in which the presence of the one or more objects is detected in the coarse detection.

In another embodiment, an ADAS is provided that includes a camera system and a processing system. The camera system includes one or more camera modules for capturing image frames of at least a portion of surroundings of a vehicle. The processing system is communicably coupled to the camera system for receiving the image frames. The processing system includes a memory to store one or more sets of image processing instructions, where each set of image processing instructions is associated with detection of objects of an object class of one or more object classes. The processing system is configured, alongwith the one or more sets of image processing instruction stored in the memory, to cause the ADAS to perform a coarse detection and a fine detection. The coarse detection of one or more objects is performed by detecting presence of the one or more objects in non-consecutive image frames of the image frames, where the non-consecutive image frames are determined by skipping one or more frames of the image frames. Upon detection of presence of the one or more objects in the coarse detection, the fine detection of the one or more objects is performed by executing corresponding set of image processing instructions of the one or more objects in at least a predetermined number of neighboring image frames of an image frame in which the presence of the one or more objects is detected in the coarse detection.

In another embodiment, a method includes performing, by a processing system, facilitating receipt of image frames of at least a section of surroundings of a vehicle being driven. The method also includes detecting presence of one or more objects while the vehicle is being driven by performing a coarse detection and a fine detection. The coarse detection of the one or more objects is performed by detecting presence of the one or more objects in non-consecutive image frames of the image frames, where the non-consecutive image frames are determined by skipping one or more frames of the image frames. Upon detection of presence of the one or more objects in the coarse detection, the fine detection of the one or more objects is performed in at least a predetermined number of neighboring image frames of an image frame in which the presence of the one or more objects is detected in the coarse detection.

Other aspects and example embodiments are provided in the drawings and the detailed description that follows.

BRIEF DESCRIPTION OF THE DRAWINGS

The advantages and features of the present invention will become better understood with reference to the detailed description taken in conjunction with the accompanying drawings, wherein like elements are identified with like symbols, and in which:

FIGS. 4A and 4B illustrate a dashcam view of the vehicle, and various RoI marked in the dashcam view, respectively, in accordance with an example embodiment;

FIG. 5 illustrates detecting a red traffic signal using a traffic signal detection instructions, in accordance with an example embodiment;

Figure 1:
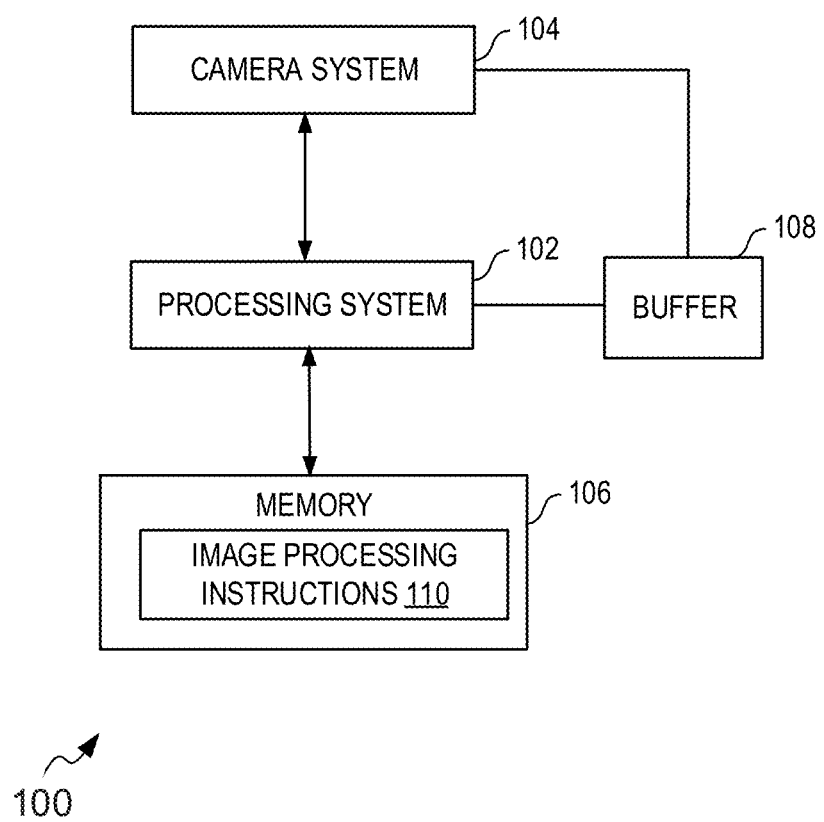
FIG. 1 illustrates an Advanced Driver Assistance System (ADAS) for object detection in an automotive environment, in accordance with an example embodiment.

The drawings referred to in this description are not to be understood as being drawn to scale except if specifically noted, and such drawings are only exemplary in nature.

DETAILED DESCRIPTION OF THE INVENTION

The best and other modes for carrying out the present invention are presented in terms of the embodiments, herein depicted in FIGS. 1 to 9. The embodiments are described herein for illustrative purposes and are subject to many variations. It is understood that various omissions and substitutions of equivalents are contemplated as circumstances may suggest or render expedient, but are intended to cover the application or implementation without departing from the spirit or scope of the present invention. Further, it is to be understood that the phraseology and terminology employed herein are for the purpose of the description and should not be regarded as limiting. Any heading utilized within this description is for convenience only and has no legal or limiting effect. The terms "a" and "an" herein do not denote a limitation of quantity, but rather denote the presence of at least one of the referenced item.

Embodiments of the present disclosure provide systems and methods for detecting objects in an automotive environment, for example when a vehicle is being driven on a road. Herein, the objects may take examples of any such thing that can impact the driving of the vehicle, or may include any objects, signs, physical representations, electronic displays that the driver should take cognizance of while driving. Various example embodiments of the present disclosure follow a two-step process for the detection of objects, for example, a coarse detection (also interchangeably referred to as 'coarse search') and fine detection (also interchangeably referred to as 'fine search'). In coarse detection, a preliminary detection of objects is performed in a manner that is computationally less intensive (e.g., by performing coarse detection on only selected image frames of a scene instead of performing object detection on all frames). In some example embodiments, once a preliminary detection of one or more objects occurs in the coarse detection, the detection of the object is further confirmed by performing the fine detection in a few (e.g., a predetermined number) neighboring frames of the frame in which the objects are detected in the coarse search. In some example embodiments, during the fine search, only selected regions of interests of the neighboring frames are searched for the object detection, where the regions of interest may be derived based on any one of classes of the objects, a historical pattern of detection of the objects, input from the coarse detection, etc. Typically, in the fine search, a more computationally complex and sophisticated processing can be done to ensure reliable detection/recognition. Some of these example embodiments will be explained with reference to FIGS. 1 to 9.

Throughout the description, the term 'image frames' are used, and it means images or image frames constituting a video (also termed as 'video frames'). The terms 'algorithm' and 'set of instructions' are also interchangeably used. Further, the term 'engine' is also used in the context of a processing system (e.g., a processor) executing the 'set of instructions', and hence scope of the term 'engine' includes the set of instructions that are executed by the processing system, unless the context suggests otherwise.

FIG. 1 illustrates an Advanced Driver Assistance System (ADAS) 100 which includes a processing system 102 and a camera system 104. The camera system 104 may include one or more camera modules for capturing image frames. The camera system 104 and the processing system 102 are communicably coupled (e.g., electronically coupled) to each other. In some forms, the processing system 102 may be embodied in the camera system 104 for processing the image frames captured by the camera system 104. The ADAS 100 also includes one or more of a memory 106 for storing image processing instruction 110, for example a set of executable instructions for detection of objects in a scene of an automotive environment. The memory 106 is a storage device embodied as one or more volatile memory devices, one or more non-volatile memory devices, and/or a combination of one or more volatile memory devices and non-volatile memory devices.

The image processing instructions 110 stored in the memory 106 are executed by the processing system 102 for the detection of objects (in both search stages i.e. the coarse search and fine search) in the image frames provided by the camera system 104. The image frames provided by the camera system 104 may be stored in one or more buffers 108 provided in or otherwise accessible to the ADAS 100. The buffer 108 is configured to store a pre-determined number of image frames. Examples of the buffer 108 may include one or more volatile memory devices, one or more non-volatile memory devices, and/or a combination of one or more volatile memory devices and non-volatile memory devices. In one form, the buffer 108 may also be embodied in the memory 106. In an example, the buffer 108 is a circular buffer, and once the buffer 108 is filled completely by the image frames, the new image frames received from the camera system 104 start replacing oldest frames in the buffer 108.

The processing system 102 is capable of executing the stored machine executable image processing instructions 110 in the memory 106 or within the processing system 102 or any storage location accessible to the processing system 102. The processing system 102 may be embodied in a number of different ways. In an example embodiment, the processing system 102 may be embodied as one or more of various processing devices, such as a coprocessor, a microprocessor, a controller, a digital signal processor (DSP), a graphics processing unit (GPU) or visual processing unit, processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The camera system 104 has image or video capturing capability and can be placed at appropriate location(s) inside or onto the vehicle such that image frames of at least some part of the surroundings of the vehicle can be captured. For instance, in one form, the camera system 104 (or one or more camera modules of the camera system 104) may be positioned on a dashboard of the vehicle, adjacent to side mirrors of the vehicle, on the roof of the vehicle, behind the rear view mirror or the like. In another additional or alternative form, camera modules of the camera system 104 may be positioned on each side of the vehicle. In at least one example embodiment, the camera system 104 may be a Virtual Reality (VR) camera for example Nokia Ozo™ camera positioned appropriately in or onto the vehicle that is capable of capturing image frames from various directions. Alternatively or additionally, any camera capable of capturing 360 degrees field of view can also be used for the camera system 104.

The camera system 104 is configured to capture images/videos of objects around the vehicle, and transfer the captured frames (of images or videos) for storage and detection of objects by the processing system 102. The objects described herein may be of different object classes. Some non-exhaustive examples of the classes of objects (or object classes) may include traffic sign related objects, traffic signal related objects, and other objects on the road (also referred to as 'road objects'). An example of the 'traffic sign related objects' may be a speed sign (e.g., 80 KMPH). Some other non-exhaustive examples of the 'traffic sign related objects' may be distance sign, milestone, direction signboards, stop sign, yield, no left turn sign, no right turn sign, no U-turn sign, no parking sign, men at work sign, stop ahead sign, no entry sign, one way sign and the like. Some non-exhaustive examples of the 'traffic signal related objects' include traffic light (e.g., red lights, green lights, yellow lights, orange lights, etc.), electronic (e.g., LEDs based) timing indicators, warning flashers, beacons, and the like. Some non-exhaustive examples of the 'road objects' may include other vehicles in front or rear of the vehicle, pedestrians, animals, speed breakers, traffic barriers/barricades, kerbs, lanes, pavements, and the like. Though all of the above mentioned examples relate to road, but it is to be understood that analogous traffic signs, symbols, lights and other objects in relation to subways, waterways, bridges and the like, are also relevant to the present disclosure. Moreover, examples of the vehicle may also include vehicles that can operate on rails, water bodies, land and air both, and unmanned aerial vehicles such as drones.

In an example embodiment, the processing system 102 along with the image processing instructions 110 stored in memory 106, is configured to cause the ADAS 100 to perform a method of object detection in the image frames provided by the camera system 104. An example representation of the method of object detection such as a method 200 is provided in FIG. 2.

Figure 2:
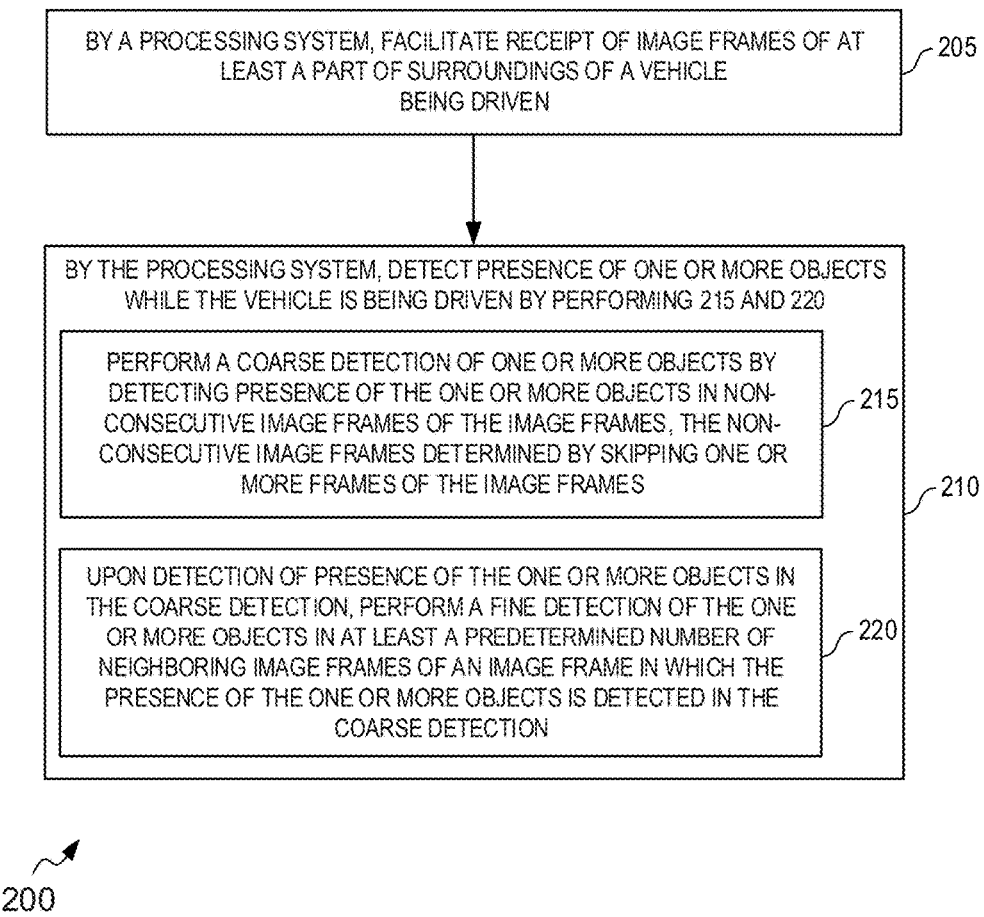
FIG. 2 is a flow diagram of a method of object detection in the automotive environment, in accordance with an example embodiment.

Referring now to FIG. 2, at operation 205, the method 200 includes facilitating receipt of image frames captured from at least a part of surroundings of the vehicle in an automotive environment. Herein, the term 'automotive environment' represents a scenario where the vehicle is being driven on road, stopped at a traffic signal, or is parked on the road. As already explained with reference to FIG. 1, the image frames are captured by the camera system 104, and the image frames received from the camera system 104 are temporarily stored in the buffer 108. The buffer 108 is a circular buffer, and once the buffer 108 is filled completely, the new frames received from the camera system 104 replace the oldest frames in the buffer 108.

At operation 210, the method 200 includes detecting presence of one or more objects by processing the image frames received from the camera system 104 by executing the image processing instructions 110 in the memory 106. In an example embodiment, the operation 210 is performed in form of two stage operations 215 and 220.

At operation 215, the method 200 includes performing a coarse detection of one or more objects, by the processing system 102 (or the processing system 602 described with reference to FIG. 6). In an example, the coarse detection includes a preliminary detection of the one or more objects in non-consecutive image frames of the image frames. The non-consecutive image frames are determined by skipping one or more frames of the image frames from processing. For example, if the image frames are captured by the camera system 104 at 60 fps (frames per second), the coarse detection of the objects may be performed at 10 fps by skipping 5 frames between any two successive frames in which the coarse detection is performed. In a representation, 'fn' denotes $n^{th}$ frame, where 'n' can be any integral number such as 1, 2, 3, 4 and so on. In the coarse detection, non-consecutive frames are defined by skipping the frames obtained from the camera system 104 by a first skip factor (s1), for example, all of the frames f(1+M*S1) (where M=0, 1, 2, 3 or any integral number) can be chosen as the non-consecutive frames. For instance, if the skip factor 'S1' is 5, using the expression f(1+m*s1), frames f1, f6, f11 and so on, will be selected for the coarse detection.

At operation 220, the method 200 includes performing a fine detection of the one or more objects upon the detection of presence of the one or more objects in the coarse detection. In an example embodiment, the fine detection is performed in at least a predetermined number of neighboring or consecutive image frames of a frame in which the one or more objects are detected in the coarse detection. In an example, if during the course of coarse detection, presence of an object (e.g., a speed sign) is detected in f6 frame, the fine detection is performed in a predetermined number of neighboring frames (e.g., four neighboring frames) of f6 for example in f7, f8, f9 and f10 to confirm the detection of the speed sign. In another example embodiment, the predetermined number of neighboring frames may also include frames captured even before f6, for example the predetermined number of neighboring frames may include f4, f5, f7 and f8 on which the fine detection should be performed.

In another example embodiment, the predetermined number of neighboring frames may be not necessarily be the consecutive frames in the neighborhood of the frame in which the object is detected in the coarse search, and the frames may be skipped by a second skip factor (S2) between two neighboring frames. However, it noted that the second skip factor (S2) must be smaller than the first skip factor (S1) that was used for selecting the non-consecutive frames during the coarse detection. For instance, in an example, if the value of 'S1' is 10, the value of 'S2' can be 1 or 2. In one form, the predetermined number of neighboring frames may be selected based on the following expression (1)

$$S(F)=f(D+O*S2) \tag{1}$$

where S(F) includes a set of image frames including the predetermined number of neighboring frames, 'D' includes a frame number in which an object is detected in the coarse detection, 'S2' is the second skip factor (S2<S1), and 'O'=integral numbers starting from 1 to 'P' (where 'P' is the predetermined number). In an example, if the S2 is 2, and the object is detected in sixth frame f6 (i.e. D=6) and the predetermined number 'P' is 4 (i.e. O=1, 2, 3, 4), the predetermined number of neighboring frames for the fine detection S(F) would be f8, f10, f12 and f14. As per the expression (1), if S2 is 1, the object is detected in sixth frame f6 and 'P' is 4, the predetermined number of neighboring frames for the fine detection S(F) would be f7, f8, f9 and f10.

In another form, the predetermined number of neighboring frames may be selected based on the following expression (2)

$$S(F)=f(D\pm Q*S2) \tag{2}$$

where Q=integral numbers starting from 1 to 'P/2' (where 'P' is the predetermined number). In an example, if S2 is 2, the object is detected on sixth frame f6 (i.e. D=6) in the coarse detection, and the predetermined number 'P' is 4 (i.e. Q=1, 2), the predetermined number of neighboring frames for the fine detection S(F) would be f2, f4, f8 and f10. Further, if S2 is 1, the object is detected in sixth frame f6 and the predetermined number 'P' is 4, the predetermined number of neighboring frames for the fine detection S(F) would be f4, f5, f7 and f8.

In an example embodiment, if the one or more objects are detected in at least a predefined number of neighboring frames during the fine detection, the presence of one or more objects is determined (or confirmed). In an example embodiment, the fine search can be stopped after processing a subset of the image frames needed for the fine search if a decision has been reached with a high confidence as to whether or not an object is present or not. In an example embodiment, once the presence of the one or more objects is determined, the ADAS 100 is configured to suggest a suitable action to be taken by the operator of the vehicle. For instance, if the speed sign of 80 kmph is detected, and the current speed of the vehicle is more than 80 kmph, the ADAS 100 displays information of over speeding, or uses speaker means to alert the operator/occupants of the vehicle.

In various example embodiments, the fine detection (also interchangeably referred to as 'fine search') is performed only in one or more selected regions of interest (RoIs) of the predetermined number of neighboring frames instead of searching in entire image frames of the predetermined number of neighboring frames. In such example embodiments, the fine detection process (i.e. the operation 220) also includes determining a region of interest (RoI) for a detected object (e.g., a detected object during the coarse detection for which the fine detection needs to be performed) from the coarse search stage, and then performing a detailed detection of the object in that area of the neighboring frames only (i.e. in the determined RoI) instead of searching the entire frame areas of the neighboring frames. The fine search logic may run multiple algorithms to ensure that the detected object is the one that is being looked for. The selection of the RoIs is described further with reference to FIGS. 3A to 3D.

In various example embodiments of the present disclosure, the coarse search is performed by detecting a distinctive feature of an object using techniques such as heuristics, template matching or machine learning, or a combination of all. For instance, in case of objects such as traffic signals, the distinctive colors of the traffic signal (e.g., red, green, etc.) can be used for coarse detection of the traffic signal. In one example, the smallest scale at which the object can be detected is the distinctive feature of the coarse search, because the traffic signals grow larger as the vehicle approaches it. Another distinctive feature is detecting an object, when they are at the biggest size, for example a vehicle just in front of the camera system 104 is detected in the coarse search but a far away vehicle may not be detected.

Once an object is detected in the coarse search, the processing system 102 switches to the fine search mode. More specifically, the fine search of an engine algorithm (e.g., image process instructions associated with the fine search) is triggered, when the coarse search triggers a detection of at least one target object. Herein, the 'engine algorithm' refers to 'image processing instructions'. In an example embodiment, the fine search is a localized search being performed in an area (RoI) that may be marked by a previous frame detection. In an example embodiment, the fine search uses video data of a higher resolution (spatial, temporal and spectral), and tries to find the object using a higher complexity level as compared to the coarse search. The fine search logic involves taking the region of interest of the detected object (e.g., a detected target object during coarse search) from the coarse search and performing a detailed detection of the object in that area. The fine search logic may run multiple algorithms to ensure that the detected object is the one that is being looked for.

Without limiting to the scope of the present disclosure, it should be understood that in case of detection of two or more objects (e.g., a speed sign and a traffic signal) simultaneously in the coarse search in different regions within the same frame (e.g., fn), the fine search stage is performed for the two or more objects by way of independently processing the two or more RoIs in the neighboring frames (e.g., fn+1, fn+2, fn+3, etc.). For example, the fine search for the speed sign may be performed in the RoI1 of the neighboring frames, and the fine search for the traffic signal may be performed in RoI2 of the neighboring frame. It is further understood that that the RoI1 is determined based on detection of the speed sign in the frame (fn) in the coarse detection stage, and the RoI2 is determined based on detection of the traffic signal in the frame (fn) in the coarse detection stage. Additionally, in one embodiment, the RoIs may be separate for individual neighboring frames (e.g., fn+1, fn+2, fn+3, etc.) depending upon factors including but not limited to speed of the vehicle and the object class.

Figure 3A:
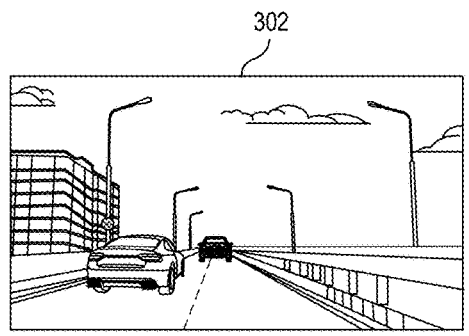
FIGS. 3A to 3D illustrate consecutive video frames and region of interest (RoI) in the video frames, in accordance with an example embodiment.
Figure 3B:
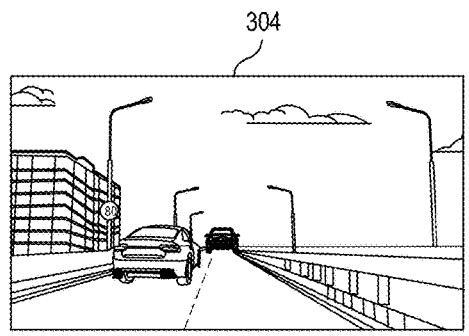

FIGS. 3A and 3B illustrate a schematic illustration of $k^{th}$ and $k+1^{th}$ frames 302 and 304. When an object, for example, a speed sign is detected for the first time in the $k^{th}$ frame in the coarse detection, then instead of performing fine detection in the entire $k+1^{th}$ frame and other consecutive frames (e.g., $k+2^{nd}$, $k+3^{rd}$ frames), an RoI is marked in the $k+1^{th}$ frame 304 for performing the fine search so as to confirm the detection of the speed sign.

Figure 3C:
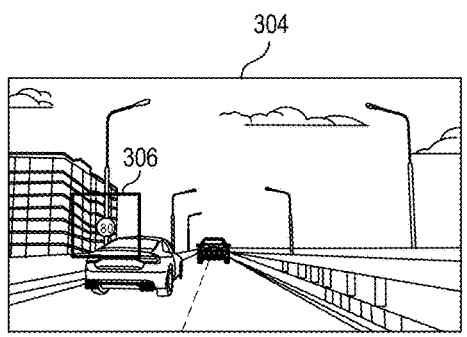
Figure 3D:
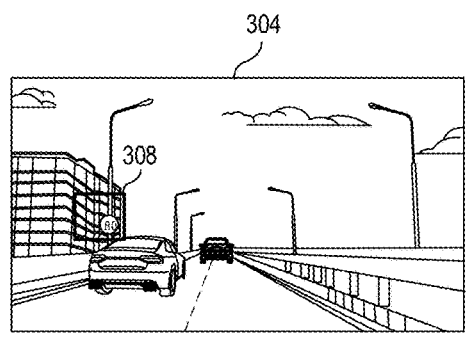

In an example, for static objects such as traffic signs, traffic lights, etc., motion heuristics may be used to mark the RoI. For example, depending on the initial location of the object in the $k^{th}$ frame during the coarse search, it may be possible to define an RoI knowing that the global motion is a zoom. In an example embodiment, by exploiting a zoom motion behavior for static objects in the automotive scenario, a smaller area or a larger area for the RoI may be defined based on factors such as speed of the vehicle and location of the object in the coarse search. For example, if the speed of the vehicle is very high, the object could be out of a RoI unless the RoI is really large, however, knowing in which direction the object is likely to move, the RoI can be defined with more accuracy. For instance, as shown in FIG. 3C, a rectangular RoI 306 may be marked in the $k+1^{th}$ frame 304 without taking into account of zoom nature of global motion, as the vehicle moves forward. Further, as shown in FIG. 3D, a rectangular RoI 308 may be marked in the $k+1^{th}$ frame 304, taking into account of zoom nature of global motion as the vehicle moves forward and its initial position in the previous frame. In an example, the direction in which an object is likely to be found in the next frame is a function of its spatial position in the current frame, and this is used to define the RoI in the next frame.

When a speed sign (e.g., 80) is detected in the $k^{th}$ frame in the coarse search, then instead of performing the fine search in the entire $k+1^{th}$ frame, the region of fine search is limited to the RoI (306 or 308) in the $k+1^{th}$ frame. In an embodiment, upon detection of the object for example the speed sign in the coarse search, the processing system 102 takes image data only corresponding to the RoI (306 or 308) of the $k+1^{th}$ frame for performing the fine search. It should be understood that any other suitable method may be used for selecting the RoI (306 or 308) with the primary objective being that the RoI (306 or 308) should be chosen such that the object detected in the coarse search in the $k^{th}$ frame is unlikely to have moved out of the selected RoI (306 or 308) in the $k+1^{th}$ frame. For example, the RoI may also be determined or predicted based on, among other factors, a historical pattern of detection of a particular class of objects from the ADAS 100 or the ADAS 600 (see, FIG. 6), and position of the camera system 104 in the vehicle, as explained with FIGS. 4A and 4B.

FIG. 4A represents a dashcam view 402 of a vehicle, and various RoIs (406a, 406b, 406c) are shown corresponding to the dashcam view 402 in FIG. 4B. Herein, the dashcam view 402 represents a view captured by a frontwardly facing camera system 104 positioned on the dashboard of the vehicle. In an example embodiment, the dash camera (example of the camera system 104) mounted on the dashboard of the vehicle has a fixed orientation. Due to the fixed orientation of the dash camera, if an object is detected in a scene at an RoI, then the probability of future detections of the same object or similar type of objects is bound to be high around that RoI. For example, in almost all the video frames generated by the dash camera when the vehicle drives in the same lane, objects associated with a traffic signal (e.g., 404a) would generally be present in the traffic signal RoI 406a, objects associated with a traffic sign (e.g., 404b) would generally be present in the traffic sign RoI 406b, and other road objects such as a front vehicle 404c would generally be present in a road object RoI 406c. It is noted that the RoIs may change slightly when the vehicle changes the lane, and accordingly, the RoIs may be defined with slightly extra area to accommodate scenarios like lane changes. In some examples, based on multiple detections of a fixed object of interest (such as a traffic sign or a traffic light), the particular object can be geo-tagged, and its RoI can be stored for example in the memory 106. The RoI, thus being specific to the particular object and already known, can be accessed from the stored location as the vehicle reaches the geo-tagged object. Event of vehicle reaching the geo-tagged object can be determined by the vehicle's current position (lane, etc.) and its location (e.g., latitude, longitude and bearing).

In an example embodiment, the processing system 102 (or the processing system 602 described with reference to FIG. 6) by executing an engine algorithm (image processing instructions associated with one object class), may implement an adaptive mask on the dashcam view 402 based on the fixed orientation of the dash camera. The adaptive mask may be determined based on past detections of the objects of same object class, and the adaptive mask can be updated with every detection of the object. More specifically, prior probabilities of an object of interest appearing in a particular region of an image or video frame can be computed from a large number of training/validation samples. In this example embodiment, computation cycles for object detection can be reduced by ignoring regions where the adaptive mask is not set. This kind of a prior map also helps in reducing false positives in the object detection. For example, the threshold condition for detecting an object could be progressively varied from low to high as one moves from an area where the object is most frequently found to areas where it is least likely to be found. The prior map or the mask can be a function of the camera mounting, i.e. the yaw, pitch and roll angles. In cases where the camera is not mounted in the most favored position, pre-processing is done to adapt the mask to the camera mount/view.

Further, in an example embodiment, with the nature of objects such as speed signs, traffic lights, etc., it may be anticipated that there is only one object of each class of object in the scene (surrounding of the vehicle being driven on a road), ordering the search for the objects in regions of decreasing order of likelihood enables faster detection of the single object present in the scene, thereby saving computations.

FIG. 5 illustrates detecting a red traffic signal by executing a traffic signal detection algorithm, in accordance with an example embodiment of the present disclosure. Herein, execution of the 'traffic signal detection algorithm' refers to execution of 'image processing instructions associated with detection of traffic signal' by the processing system 102 (or the processing system 602 of FIG. 6). In the traffic signal detection algorithm, a red blob 502 of size W×W pixels may be defined for detecting red light region of the traffic signal. A vertical crop 504 of an input image of size AW×W pixels may be used for detecting a vertical traffic signal, and a horizontal crop 506 of the input image of size W×AW pixels may be used for detecting a horizontal traffic signal. A suitable example of the aspect ratio 'A' may be equal to 3, however it can have other values as well depending upon the structure and configuration of the traffic signal.

In one implementation, detection of only red light among various colors of lights used in the traffic signal, may be performed instead of a general traffic light detection. In this case, for the coarse search, the total search space may be significantly reduced by using heuristics based on empirical data. In an example, a redness mask may be defined based on one of the following example expressions (3), (4) and (5):

$$M(x,y)=1 \text{ if } Cr(x,y) > \text{threshold, else } 0 \quad (3)$$

$$M(x,y)=1 \text{ if } Cr(x,y)/Cb(x,y) > \text{threshold, else } 0 \quad (4)$$

where Cr=chrominance (of YCrCb) where Cr=Red(R)-Yellow(Y) and Cb=Blue(B)-Yellow (Y)

$$M(x,y)=1 \text{ if } R(x,y)*S(x,y) > \text{threshold,} \quad (5)$$

where R=red channel, and S=saturation as defined by HSV space, this has the advantage of selecting pixels that are red, bright and saturated. Since, by utilizing the expression (5) those pixels could be selected that have high red component such as yellow or magenta, the definition of saturation can be modified to ensure that only primary color red pixels are selected. Hence, to ensure that only primary colors have a high saturation, 'S' may be defined as S=1−median(RGB)/max(RGB).

Once a redness mask is defined as mentioned above, connected components analysis may be done to select blobs which satisfy geometric properties such as aspect ratio, size, etc. For example, the red blob 502 has to have an aspect ratio close to 1.0, since the red light is circular. If the red blob 502 as defined satisfies the above-mentioned expressions (3), (4) and/or (5), the red blob could be considered a part of the red signal. To check this, the vertical crop 504 is taken, such that the red blob 502 should be a part of the vertical crop 504, in order to qualify as the red traffic signal.

In an example embodiment, a classifier (or a template matcher) detects whether the vertical and horizontal crops 504 and 506 contain a red signal or not. The red signal is detected based on the brightness and saturation. It may be assumed that no color than red has a significant brightness or saturation. If the color saturation and brightness is higher in a lower portion of the vertical crop 504, or a hue other than red is determined to be present, it is concluded that the vertical crop 504 does not include a red signal. Similarly, if the color saturation and brightness is higher in a right portion of the horizontal crop 506, or a hue other than red is determined to be present, it is concluded that the horizontal crop 506 does not include the red signal. In one example, the horizontal and vertical crops are tested one after another to detect the red signal. In another example, both the horizontal and vertical crops are tested together to detect the red signal. The models for horizontal and vertical signals can be separately built, or the models trained for one can be used by rotating, the image crop region before classification. For example, if only the vertical signal model was trained, then the horizontal crop may be rotated by −90 degrees and the same model can be used for classification.

Once a traffic signal is detected in a current frame in the coarse search, the traffic signal detection algorithm conducts fine search in RoIs of subsequent frames to confirm the detection of the red signal. In an example embodiment, in the fine search, the detection of the objects is performed only in the RoI, hence the classifier conditions can be loosened for tracking since it is already known that there is a red signal present in the frame.

In an example embodiment, following state machine logic may be implemented in the object detection (e.g., traffic signal) algorithm.
  a. When a red signal is not detected in a coarse search of a current frame, the current state is set to 0, else the current state is set to 1.
  b. When a red signal is detected in the coarse search of the current frame, a fine search is conducted in RoIs of next N consecutive frames
  c. When the presence of red signal is confirmed in n frames of N frames, and if n/N>a, where 'a' is a predefined threshold, detection of red signal is confirmed and the state is set to 2, else the state is set to 0.
  d. When the current state is 2, fine search is executed after every N frames. When the red signal goes off, or is occluded by another object in front, the criteria for exiting state 2 is met, and the state is set to 0 again.

In an example embodiment, in the coarse search process, the traffic light detection algorithm could use either a template or a model learnt by machine learning, and work on a lower spatial and/or temporal resolution. For example, instead of 720p video, the coarse search could work at 360p and instead of 15 fps, it could work at 3 fps. If a detection happens, then a fine search is triggered in which a higher temporal resolution is made available. Further, processing can happen only in the region of interest, i.e. around the co-located point where the detection had happened in the previous frame in the coarse search.

In various example embodiments, coarse search for traffic sign detection involves searching for a traffic sign at the smallest scale possible. Since the traffic sign becomes larger and larger as it approaches the dash camera, it is important to detect the traffic sign as soon as possible. Once detected early, subsequent frames can be used for ensuring that a proper sign has been detected. Thus, an engine algorithm is trained to detect a traffic sign at the smallest size, for example, in 30×30 area for a 720p video frame (with no loss of generality). Once the detection happens at this scale, the subsequent frames are processed by the fine search algorithm. The fine search logic is executed for all the scales greater than the scale at which the traffic sign has been detected in the coarse search. The fine search logic is continued till the object is confirmed to be present by validation through subsequent frames. The fine search algorithms executed by the processing system can be more complex, since the probability of finding multiple objects from different engines together is very low in an automotive environment. For example, it may be a very low probability event that a traffic speed sign is present close to a traffic signal.

Figure 6:
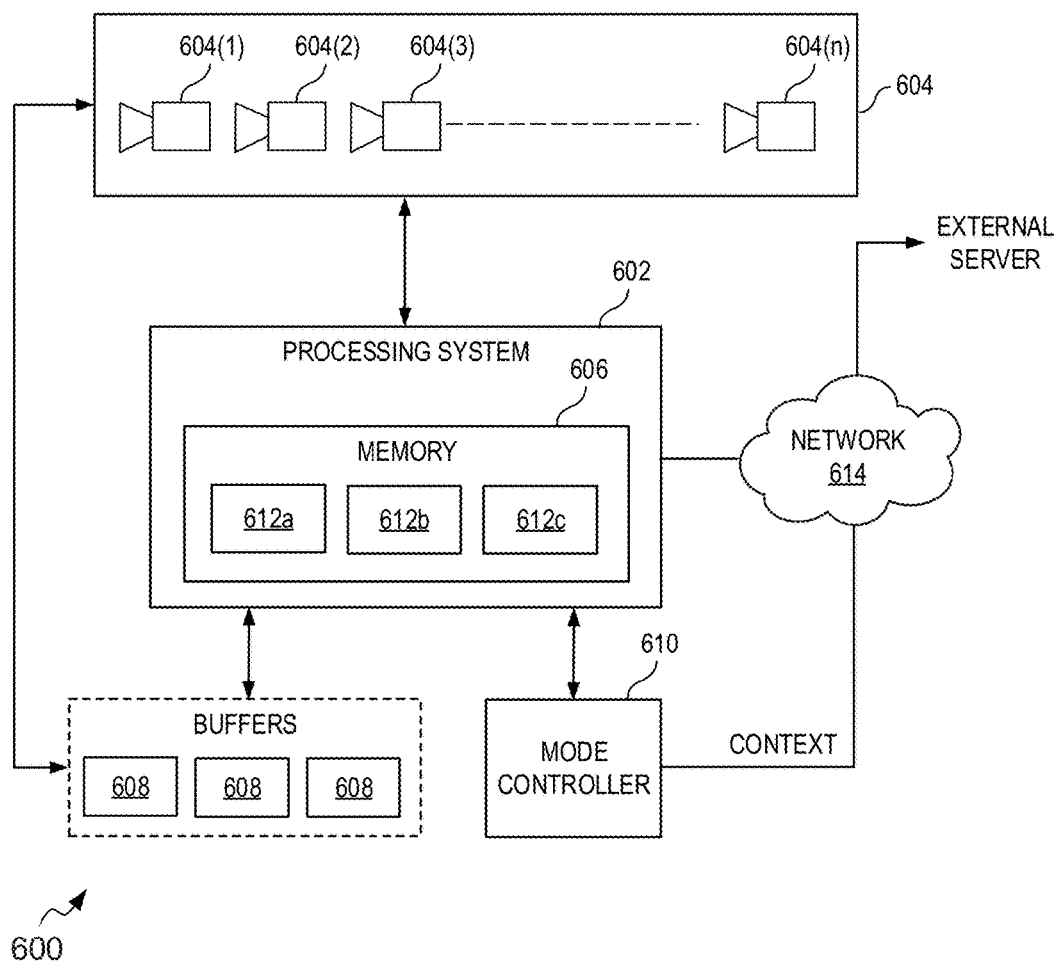
FIG. 6 illustrates an ADAS, in accordance with another example embodiment.

Another example embodiment of ADAS such as an ADAS 600 is shown in FIG. 6, in which the ADAS 600 includes a processing system 602 and a camera system 604. The processing system 602 includes one or more instances of a memory 606. The ADAS 600 also includes one or more instances of buffers 608 for storing image frames obtained from the camera system 604. The ADAS 600 also includes a mode controller 610, wherein the mode controller 610 can be embodied as part of the processing system 602, or may be a separate entity electronically coupled with the processing system 602.

The camera system 604 includes one or more camera modules for example, first through $n^{th}$ camera modules 604(1), 604(2) . . . . till 604(n) ('n' can be any integer number). The camera system 604 and the processing system 602 are communicably coupled (e.g., electrically or electronically coupled) to each other. Each of the camera modules 604(1) to 604(n) can have image capturing capability and these modules can be placed at appropriate locations inside the vehicle or onto the vehicle, such that, image frames of at least some part of the surroundings of the vehicle can be captured. For instance, in an example, one or more camera modules may be positioned on a dashboard of the vehicle, or adjacent to side mirrors of the vehicle, behind the rearview mirror, on the roof of the vehicle, and/or on a rear side of the vehicle. Alternatively or additionally, a camera module may be positioned on each side of the vehicle. Such positioning of the camera modules described herein should not be considered limiting, and camera modules can be positioned in any order so as to enable capture of the objects in the automotive environment. In one example embodiment, there may be a single camera module (e.g., Nokia Ozo™ camera) positioned appropriately within or onto the vehicle that is capable of capturing image frames from various directions in the surroundings of the vehicle. In one example, a 360 degree camera can also be used constituted by either one camera that can capture 360 degrees field of view, or a system comprising multiple cameras such that output of the multiple cameras can be stitched to form a 360 degrees field of view image of the surroundings of the vehicle.

In this embodiment, the ADAS 600 includes one or more sets of image processing instructions such as 612a, 612b, and 612c stored in the memory 606. In an example, each instruction set of the instruction sets 612a, 612b and 612c is associated with detection of objects of at least one object class from one or more object classes in the automotive environment. Some non-exhaustive examples of classes of objects (or object classes) may include 'traffic sign related objects', 'traffic signal related objects', and 'road objects', as explained with reference to FIG. 1. In an example, the instruction set 612a may be associated with detection of objects belonging to the object class 'traffic sign related objects', and the instruction set 612b may be associated with detection of objects belonging to object class 'traffic signal related objects', and the instruction set 612c may be associated with detection of objects belonging to object class 'road objects'.

For the purposes of description, it is assumed that the processing system 602 has a plurality of processing engines, where each engine is dedicated for detection of objects of one object class. The instruction set 612a when executed by the processing system 602, may also be interchangeably termed as 'traffic sign detection engine 612a'. Similarly, the instruction set 612*b* when executed by the processing system 602, may also be interchangeably termed as 'traffic signal detection engine 612*b*', and the instruction set 612*c* when executed by the processing system 602, may also be interchangeably termed as 'road objects detection engine 612*c*'. It should be noted that the engines 612*a*, 612*b* and 612*c* may not be physically separate entities, however in at least one embodiment, they may be virtually separated within the processing system 602 for executing the corresponding image processing instructions. Moreover, in at least one example embodiment, the processing system 602 may have sub-processing systems, where each sub-processing system is dedicated for detection of objects belonging to at least one object class.

In an example embodiment, purpose of one or more camera modules of the camera system 604 may be for capturing video frames of objects belonging to its corresponding class of objects. For instance, the camera modules 604(1) and 604(2) may be oriented to, or its settings may be optimized, to capture traffic signs; and the camera module 604(3) may be oriented to, or its settings may be optimized to capture traffic signals. In an example embodiment, there may be 'n' number of buffers 608 where each buffer 608 corresponds to a camera module. Each of the buffers 608 may be configured to store a pre-determined number of image frames obtained from its corresponding camera module. Alternatively, there may be a single buffer 608 that can store the frames obtained from all camera modules of the camera system 604.

In an example embodiment, the processing system 602 executes a particular set of image processing instructions (e.g., a particular engine algorithm of one object class) only on the image frames that are obtained from the camera modules dedicated for capturing objects of the particular object class. For instance, the processing system 602 executes the instructions 612*a* (i.e. the traffic sign detection engine 612*a*) on the image frames obtained from the camera modules 604(1) and 604(2), as the camera modules 604(1) and 604(2) are oriented and their settings are optimized to capture the traffic signs. Similarly, the processing system 602 executes the instructions 612*b* (i.e. the traffic signal detection engine 612*b*) on the image frames obtained from the camera module 604(3), as the camera module 604(3) is oriented and its settings are optimized to capture the traffic signals.

The processing system 602 is configured to perform fast execution of multiple computer vision algorithms (e.g., associated with the plurality of sets of image processing instruction) for detecting multiple objects (e.g., objects from multiple object classes) in the automotive environment. In an example embodiment, each set of image processing instructions is executed by the processing system 602 in a two stage search, i.e. coarse search and fine search for detecting one or more objects.

As also explained with reference to FIG. 1, the coarse search stage is the default stage, which is computationally less complex and is designed to detect or localize objects, using a distinctive feature such as color, shape etc., or a particular scale/size of the object. In one form, the coarse search may be 'coarse' in terms of spatial resolution, temporal resolution or spectral resolution (e.g., gray vs. color). Furthermore, once an object of interest is detected (like a traffic sign or traffic light), it may not be necessary to scan the entire scene or field of view to track it. In such a scenario, it is advantageous to process only a region of interest. The camera sensor capabilities can be utilized to readout only the region of interest, instead of reading out the whole frame or field of view (FOV). This results in faster readouts and lesser power consumption. In an example embodiment, in the coarse search, the processing system 602 is configured to detect only an object class by involving less computationally intensive processes, for example by skipping certain frames. Further, in the fine search, the processing system 602 is configured to identify the actual object within the object class detected during the coarse search. For example, considering the case of traffic signs, in the coarse search, the processing system 602 may determine a presence of the traffic sign. Further, in the fine search, the processing system 602 is configured to detect which type of traffic sign is present in the frames by searching within RoIs. For instance, there may be different objects falling into the traffic sign class, for example, a speed sign, a stop sign, caution sign, yield sign, silent zone sign, among others, and one or more of these objects can be detected in the fine search.

In an example embodiment, the ADAS 600 may have a plurality of modes of operation, and the ADAS 600 may operate in one or more of the plurality of modes at a time, based on at least one context. Some non-exhaustive examples of the modes in which the processing system 602 of the ADAS 600 can operate are as follows:
1. Traffic sign detection mode
2. Traffic signal detection mode
3. Road objects detection mode (e.g., Pedestrian detection mode, and Vehicle detection mode)
4. Tracking mode
5. Non-traffic object detection mode (e.g., detection of road width, or any other relevant object)

In an embodiment, the mode controller 610 is configured to determine the one or more modes of operations for the processing system 602 based on at least one context in the automotive environment. In an embodiment, the mode controller 610 is a part of the processing system 602. In an example, the processing system 602 controls the camera modules of the camera system 604 so as to capture image frames based on the one more modes in which the processing system 602 currently operates. For instance, the camera system 604 may include specialized scene modes that can be activated based on the one or modes in which the processing system 602 operates, wherein the one or more modes are selected by the mode controller 610 based on the at least one context.

An example of the at least one context may be a speed of the vehicle. In an embodiment, the mode controller 610 is configured to access information of the speed of the vehicle. In a use case scenario, if the speed of the vehicle is below a threshold speed limit (e.g., 30 kmph), detection of the speed sign may not be needed, however detection of other objects such as traffic light detection, pedestrian detection, etc., may still be needed. Hence, in such use case scenario, the instructions corresponding to detection of the traffic sign (e.g., instructions 612*a*) may not be executed until the speed of the vehicle goes beyond the threshold limit. Hence, the processing system 602 will not operate its traffic sign detection engine 612*a*, and other engines (e.g., 612*b* and 612*c*) are kept ON. Optionally, a camera module dedicated to capture the traffic sign (e.g., camera modules 604(1) and 604(2)), may also be disabled as long as the speed of the vehicle is below the threshold speed. It should be noted that the value of the threshold speed limit can be customized by the user.

Another example of the context can be detection of a particular object or particular class of objects. In a use case scenario, if a speed sign is detected, it is unlikely that a traffic light will be very close by in distance/time. Also, if a speed sign of a certain speed or above is detected (e.g., above 60 kmph), then it is highly unlikely for a traffic light or a speed breaker to be present. Hence, in such use case scenario, the instructions corresponding to detection of traffic signals (e.g., instructions 612b) may not be executed for at least a predetermined time interval. Hence, the processing system 602 will skip the traffic signal detection engine 612b, and other engines (e.g., 612a and 612c) are kept ON. Optionally, a camera module dedicated to capture the traffic signals (e.g., camera modules 604(3)), may also be disabled for the predetermined time interval. It should be noted that the value of the predetermined time interval can be customized by the user, and can be determined based on the speed of the vehicle and location or any other historical data.

Another example of the context can be availability of geo-tagged locations with corresponding objects. For example, the mode controller 610 or the processing system 602 is configured to access information of presence of objects along the route from an external database (e.g., a web based application or server). The mode controller 610 may be connected to the server via a network 614 for example, a wireless network without loss of generality. Some objects, for example the traffic lights may be geo-tagged and their exact or approximate location may be made available to the processing system 602 through suitable communication means (via the network 614), or such information may also be pre-installed in a memory present within the ADAS 600. In a use case scenario, if all of the traffic lights along the route are geo-tagged, the set of instructions (e.g., instructions 612b) corresponding to detection of traffic light may not executed and the processing system 602 will skip the traffic signal detection engine 612b. In this scenario, the camera module of the camera system 604 dedicated to capture the traffic signals (e.g., camera modules 604(3)), may also be disabled In an example embodiment, the mode controller 610 may also use the context to determine that which set of instructions should be executed and/or a priority order in which they should be executed.

In the camera system 604 in which a single camera module is present, the user of the vehicle may condition the image capture of the surroundings of the vehicle so as to suit the detection of the desired objects. For instance, the user may provide inputs to the mode controller 610 or the processing system 602 for prioritizing or enabling/disabling one or more object detection engines. For instance, the user may desire detection of 'N' types of object classes. In a use case scenario, if the user has selected a detection of 'traffic sign' and 'traffic signal' (N=2 with traffic sign and traffic signal detections), then, temporal multiplexing in camera settings can be done in a way that a captured frame is captured with settings optimal for a particular task. For instance, alternate frames could be captured with settings optimized for the two respective algorithms ('traffic sign' and 'traffic signal'). In an example embodiment, during the fine search, the camera settings temporal multiplexing may be disabled till such time that the fine search is on.

It should be appreciated that the camera systems 104 or 604 may be customized to suit the object detection process based on the context and user preferences, among other things. In use cases, for visual detection from a dash camera of the camera systems 104 or 604, the scene of interest may occur only at hyperfocal distance and beyond (e.g., approximately 2-3 meters or greater). So, in an example embodiment, the auto focus of the camera module is thus disabled, and the focus is permanently set to infinity. This results in several following advantages, among others:

Lower power consumption and lower latency, since auto focus is not performed

Objects of interest are always in focus, unlike with auto focus when an error in focusing can result in a near field being focused (e.g., dust on windshield, wipers, etc.). Focusing the near field means that the far field will be blurred and this can have an adverse effect on the object detection and other algorithms.

Low light/Night—Conventional auto exposure techniques will result in very long exposure times since they try to optimize the whole scene. Objects of interest are mostly on the road, illuminated by street lights and headlights. Other surroundings and sky are of little interest, and therefore, the scene can be under exposed to a fixed amount from the exposure estimated by the auto exposure engine. Since, in some embodiments of the present disclosure, auto exposure is disabled, hence such drawbacks are precluded.

Further, it is common for traffic scenes captured from dash cameras to be of high dynamic range. This means that parts of the traffic scene will always be under or over exposed. The exposure in this case is always set to avoid under exposure. This means, the shadow regions are exposed better at the risk of saturating the highlights. This helps because, in traffic scenes captured by a dash camera, the sky often occupies a large area. The area of interest is the road, and it is important that it is exposed correctly. Even in camera modules with a high dynamic range (HDR) mode, it may be preferred to ensure that the shadow and midtone regions are rendered correctly, at the expense of highlights. This is especially true when detecting a non-emissive object such as traffic sign, vehicle etc., unlike a traffic light which by virtue of being an emissive object can easily get saturated.

Furthermore, in at least one example embodiment, the camera systems 104 or 604 under expose the scene so that the visual clutter is reduced, and the traffic light, being an emissive source is clearly visible. This simplifies detection, reduces latencies and reduces false positives in object detection. This exposure can be a fixed setting, since traffic lights' emissivity is standardized. The calibration of traffic lights' brightness and exposure required can be done one time in a lab for different types of cameras if required. The above could be used in coarse search to localize the traffic lights with fine search using either under-exposed or normally exposed frames.

Furthermore, the video frame rate can be a function of the traffic scene. The video frame rate can be lowered to save power when the scene in front has no activity, for example driving on an isolated highway, or when the vehicle is stationary for a long time. The moment any activity is determined (such as a car in front or on the sides) or a road/traffic sign is detected (either geo tagged signs or visually detected signs), then, a higher frame rate can be used.

Figure 7:
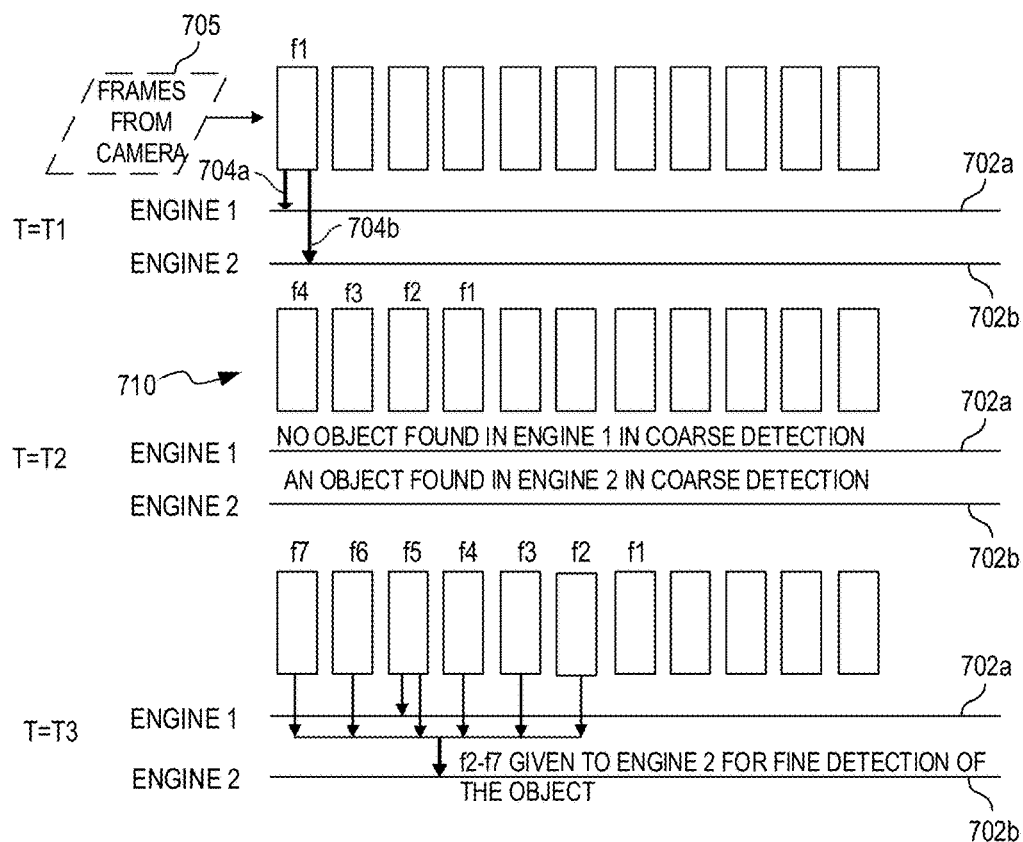
FIG. 7 illustrates system level management of simultaneously executing two set of image processing instructions for detection of traffic sign and traffic signal, in accordance with an example embodiment.

FIG. 7 illustrates system level management of simultaneous detection of objects of multiple object classes. For the sake of simplicity, only two engine algorithms are illustrated in FIG. 7, however more than two engine algorithms may be executing simultaneously for detecting objects of more than two object classes. In the example representation of FIG. 7, two engine algorithms 702a and 702b are shown, where the first engine algorithm 702a may be a traffic sign detection algorithm, and the second engine algorithm 702b may be traffic signal detection algorithm. The first and second engine algorithms 702a and 702b are hereinafter also referred to as first and second engines 702a and 702b respectively.

In an example embodiment of the present disclosure, the video/image frames are continuously obtained from the camera module such as the camera system 104 (see FIG. 1) or the camera system 604 (see, FIG. 6) and stored in a rotating buffer (e.g., the buffers 108 or 608). The rotating buffer is implemented to handle the continuous frames that are being generated by the camera system. In an implementation, the buffer has a fixed storage size and may be a circular buffer. For instance, the circular buffer size may be capable of storing 30 frames and the frame rate of the camera system is set at 15 frames per second. As the buffer is a circular buffer, once the buffer is completely full, the new frames received from the camera system start replacing the oldest frames in the buffer. The rate at which the frames are received in the rotating buffer versus the rate at which the first and second engines 702a and 702b process the frames may be different. As more engines are added into the system, a much higher lag may occur between the rate at which camera module generates the frames and the rate at which the engines processes them. In an example, an engine may need around 3-5 frames per second to detect objects in a traffic scene of an automotive environment, given the speed at which a vehicle travels and the distance at which the most of the objects are present from the camera system. In use scenarios, the engines of the ADAS 100 or 600 are configured to detect objects at, at least this rate in the coarse search, so as to not miss any object in a scene.

In the schematic representation of FIG. 7, at a time '0', some frames (see, 705) received by the rotating buffer from the camera system are shown. In a typical operation of the object detection, the first frame (see ' f1') from the camera module is provided to each of the first and second engines 702a and 702b, shown by reference numerals 704a, 704b, respectively. In an example, the first engine 702a is configured to detect a traffic sign in the first frame (see, f1 in FIG. 7), and the second engine 702b is configured to detect a traffic signal in the first frame f1.

Both the engines 702a and 702b may take their own time in processing the frame f1, and detecting respective object/event in that frame f1 using the coarse search. In this example, it may be assumed that by the time, both engines are performing the coarse search on the f1, three new frames f2, f3 and f4 (see, 710) are received in the buffer as shown at time 't2'. It may be assumed that the first engine 702a does not detect any traffic sign in the f1, whereas the second engine 702b detects a traffic signal in the frame f1.

In an example embodiment, when the first engine 702a does not detect a traffic sign in the first frame, then the next frame (or any predefined future frame), for example the fifth frame (see, f5) already available in the buffer (received from the camera system) is provided to the first engine 702a for further processing, as shown at time 't3'. In this example operation, when the second engine 702b detects a traffic signal in the first frame f1, then RoIs of subsequent frames such as second to seventh (see, f2, f3, f4, f5, f6 and f7 in FIG. 7) frames are provided to the second engine 702b for conducting a fine search therein.

In an example embodiment, the rotating buffer is common across all the engines, and every frame has a flag corresponding to an engine. If the flag is set, then the frame is given to respective engine for processing. In an example embodiment, the ADAS 100 or 600 includes the mode controller 610 for managing the simultaneous execution of various engines, and assigning of frames to the engines. The mode controller 610 uses intelligent heuristics and rules to determine which engines are to be run, and how much priority should be given to them.

Figure 8:
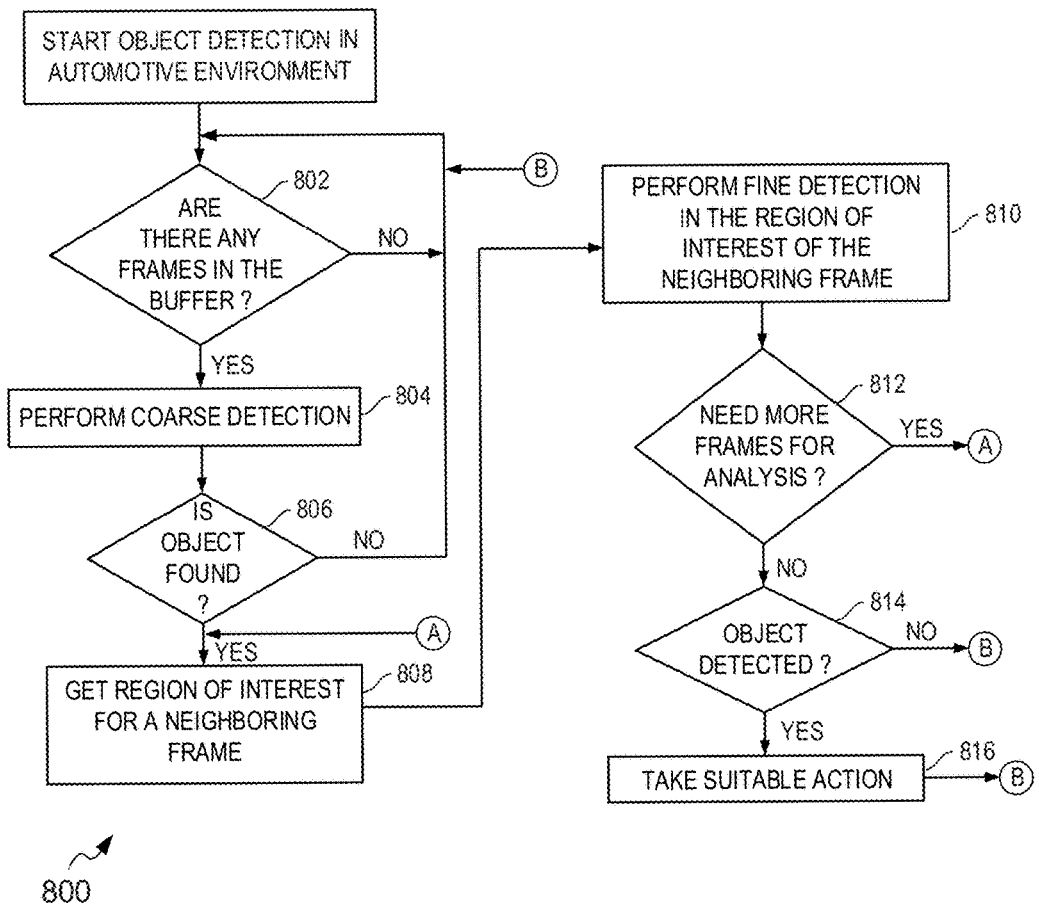
FIG. 8 is a flow diagram of a method of object detection in the automotive environment, in accordance with another example embodiment.

FIG. 8 is an illustration of operations of a method 800 of using the ADAS 100 or ADAS 600 for object detection in an automotive environment, in accordance with an example embodiment of the present disclosure.

At operation 802, it is checked if there are any frames in the buffer. If there are no frames in the buffer, the process goes back to operation 802 (e.g., waits for any incoming frames in the buffer).

If there are frames in the buffer, then at operation 804, a coarse search is performed for detecting an object in an incoming frame (e.g., a current frame received in the buffer) by one or more engine algorithms.

At operation 806, it is checked if a corresponding object is found in the incoming frame. If the object is not found, the process goes back to operation 802, and the wait for a next frame. Herein, the next frame is a non-consecutive image frame of the previous frame (on which the last coarse detection was performed) by skipping certain frames in the buffer.

If at operation 806, the corresponding object is found, then at operation 808, a region of interest (RoI) is obtained for a new frame (e.g., next frame of the incoming frame in which object is detected). The new frame is an immediate neighboring frame of the frame on which the object was detected in the coarse detection.

At operation 810, the fine search is performed in the RoI of the new frame, where the RoI is determined as per the previous detection of object during the coarse detection.

At operation 812, it is checked if more frames are needed for the fine search and analysis. If more frames are needed for analysis, the process goes back to operation 808, and the RoI of the next neighboring frame is obtained.

If more frames are not needed for analysis, then at operation 814, it is checked if the object is detected.

If the object is not detected, the process goes back to operation 802.

If the object is detected, then at operation 816, a suitable action is taken (e.g., vehicle speed is lowered, or stopped in case of red light detection), and the process goes back to operation 802.

Figure 9:
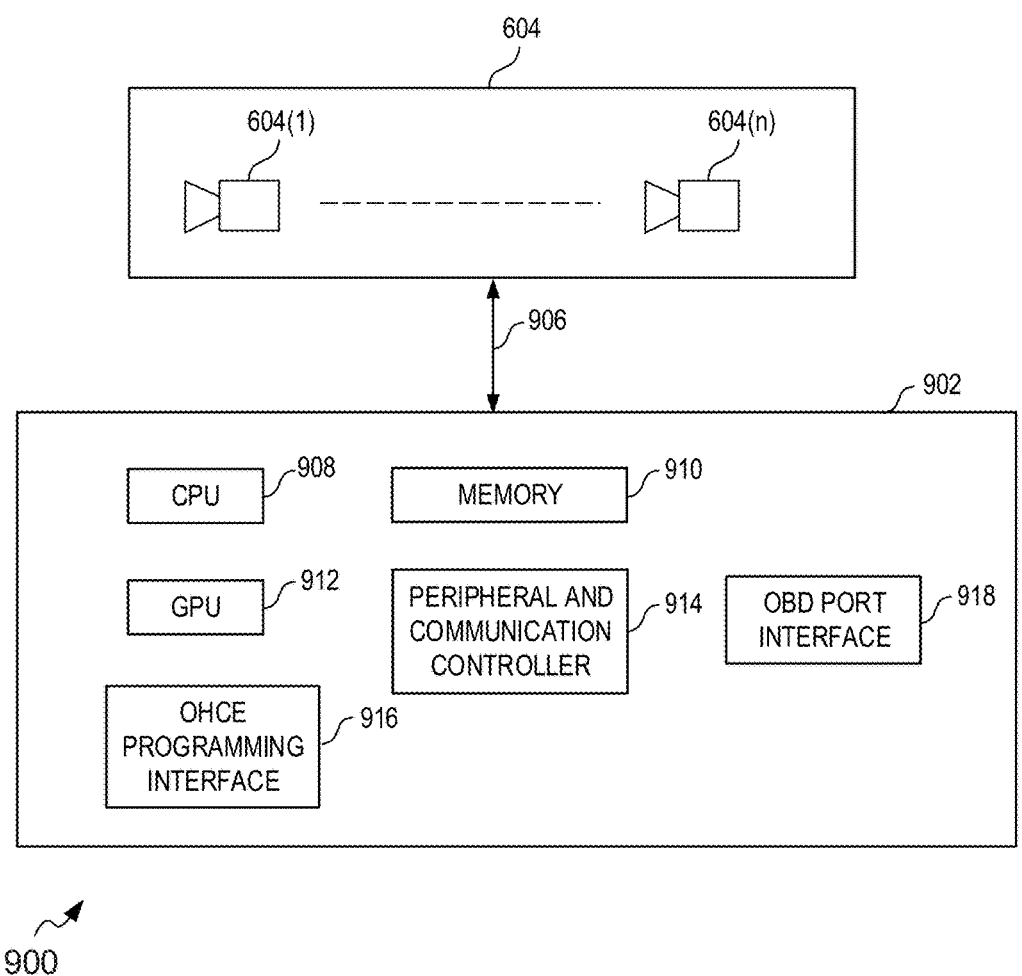
FIG. 9 illustrates an ADAS, in accordance with another example embodiment.

Referring now to FIG. 9, another example representation of ADAS 900 is shown in accordance with an example embodiment. The ADAS 900 includes an Onboard Hardware Computation Engine (OHCE) 902, and the camera system 604 comprising one or more camera modules for example, first through $n^{th}$ cameras 604(1), 604(2) . . . . till 604(n) connected to the OHCE 902 via a communication link 906. Example of the first through $n^{th}$ cameras 604(1), 604(2) . . . . till 604(n) includes, but is not limited to a dash camera installed in vehicles. The communication link 906 can be either wired or wireless. In one embodiment, the camera system 604 can be implemented using one or more smartphones equipped with camera capabilities placed on suitable places, for example onto the dashboard of the vehicle and/or rear portion of the vehicle. In another embodiment, existing dash cameras installed on the vehicle that can communicate with a system having a processor, memory etc., can be used.

In an example embodiment of the present disclosure, the OHCE 902 is a compact single board computer that includes a central processing unit (CPU) 908 for general purpose computation, a memory 910 such as RAM and ROM, a graphics processing unit (GPU) 912, an external peripheral and communication controller 914 for facilitating connection to various external devices, an OHCE programming interface 916 for enabling the user to program the OHCE 902, and an onboard diagnostics (OBD) port interface 918 for connecting the OHCE 902 to an OBD port (not shown) of the vehicle. In an implementation, the OBD port may be a 16-pin female connector located on driver's side of passenger compartment near the center console. It includes 12 volt (V) and 5V power pins that draw power from the vehicle battery. Apart from the power pins, the OBD port includes data pins for conveying information about engine performance and diagnostics.

In an example embodiment, the OHCE 902 is installed physically on the OBD port near the center console, and is powered either by the OBD of the vehicle or an external power source. In another example embodiment of the present disclosure, the monitoring capability of the OBD device is built into the ADAS 900, and is achieved by reading a Controller Area Network (CAN) bus into the OHCE 902. The OHCE 902 extends the functionality of the current OBD devices, i.e. camera interface, compute engine, GPS and inertial sensors.

The camera module 604 is configured to capture images/videos of objects in front of the vehicle, and transfer the same to the OHCE 902. Some non-exhaustive examples of the objects may include a traffic light and a speed sign on roads. Some other non-exhaustive examples of the objects include a direction signboard, a distance board, vehicles or objects in front of or behind a vehicle, pavements, pedestrians, or any other traffic sign boards used in relation to roads, highways, freeways, subways, waterways, bridges, and the like. Each of the above object detection algorithms would be referred to as engine algorithm. Examples of the vehicle include any movable vehicle on the road. Other examples of the vehicle also include vehicles that can move on water bodies, land and air both, and unmanned aerial vehicles such as drones. In an example embodiment of the present disclosure, the OHCE 902 may be programmed to statically or dynamically register the first through $n^{th}$ cameras of the camera system 604. The camera system 604 captures and sends the buffers of captured images and/or frames of videos to the OHCE 902 for further processing by the multiple computer vision engine algorithms executing in the GPU 912 and/or CPU 908.

The GPU 912 aids the fast execution of multiple computer vision algorithms for detecting multiple objects. In an example embodiment of the present disclosure, each computer vision engine algorithm executing in the GPU 912 performs two stage search, i.e. coarse search and fine search for detecting an object in a frame. The coarse search stage is the default stage, which is computationally less complex and is designed to detect or localize objects, using a distinctive feature such as color, shape etc., or a particular scale/size of the object. The coarse search may be 'coarse' in terms of spatial resolution, temporal resolution or spectral resolution (e.g., gray vs. color).

Various embodiments disclosed herein provide numerous advantages in the field of object detection in an automotive environment. The systems and methods disclosed herein enable optimization at the algorithm level using concept of coarse and fine searches, and optimization at the system level by managing frame assignment to simultaneously executing algorithms, resulting in reduced complexity and memory requirements. Various embodiments also provision for searching within the RoIs intelligently selected for the fine search, thereby reducing complexity of the object detection.

Various embodiments described above may be implemented in software, hardware, application logic or a combination of software, hardware and application logic. The software, application logic and/or hardware may reside on one or more memory locations, one or more processors, an electronic device or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, as described and depicted in FIGS. 1 and 6. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. An advanced driver assistance system (ADAS), comprising:

a camera system for capturing image frames of at least a part of surroundings of a vehicle;

a memory comprising image processing instructions; and a processing system communicably coupled to the camera system for receiving the image frames, the processing system configured, along with the image processing instructions stored in the memory, to cause the ADAS at least to:

determine non-consecutive image frames of the received image frames based on skipping one or more image frames of the image frames;

perform a coarse detection of one or more objects present in the determined non-consecutive image frames of the image frames;

determine one or more regions of interest, corresponding to the coarsely detected one or more objects, within each image frame of a predetermined number of neighboring frames based on a historical detection pattern of the coarsely detected one or more objects; and upon detection of the presence of the one or more objects in the coarse detection and detection of the one or more regions of interests, perform a fine detection of the one or more objects in the detected one or more regions of interests present in at least one image frame of the predetermined number of neighboring image frames of an image frame in which the presence of the one or more objects is detected in the coarse detection.

2. The ADAS as claimed in claim 1, wherein the ADAS is further caused, at least in part, to:

select the non-consecutive image frames by skipping the one or more image frames by a first skip factor; and select the predetermined number of neighboring image frames by skipping image frames in neighborhood of the frame by a second skip factor,
wherein the second skip factor is smaller than the first skip factor.

3. The ADAS as claimed in claim 1, further comprising one or more buffers of a predetermined storage capacity for storing the image frames captured by the camera system.

4. The ADAS as claimed in claim 1, wherein the one or more regions of interest are further determined based on at least one of:
a region in which the presence of the one or more objects is detected in the coarse detection; and
a predefined region of interest.

5. The ADAS as claimed in claim 1, wherein the one or more objects comprise objects of one or more object classes, the one or more object classes comprising:
objects related to traffic signal;
objects related to traffic sign; and
objects on a road on which the vehicle is driven.

6. The ADAS as claimed in claim 5, further caused at least in part to:
access information of a current speed of the vehicle; and
upon determining the current speed of the vehicle being less than a threshold speed, skip the coarse detection of a speed sign, the speed sign being an object of the objects related to traffic sign.

7. The ADAS as claimed in claim 5, further caused at least in part to:
upon detection of a speed sign in the fine detection, skip the coarse detection of a traffic light for a predetermined time period, the speed sign being an object of the objects related to traffic sign and the traffic light being an object of the objects related to traffic signal.

8. The ADAS as claimed in claim 1, wherein the camera system is configured to operate in one or more modes of a plurality of modes based on a mode instruction received from the processing system, the plurality of modes comprising a traffic sign detection mode, a traffic signal detection mode, and a road objects detection mode, wherein the mode instruction is generated based at least on at least one context determined by the processing system.

9. An advanced driver assistance system (ADAS), comprising:
a camera system comprising one or more camera modules to for capturing image frames of at least a portion of surroundings of a vehicle; and
a processing system communicably coupled to the camera system for receiving the image frames, the processing system comprising a memory to store one or more sets of image processing instructions, each set of image processing instructions associated with detection of objects of an object class of one or more object classes, the processing system configured, along with the one or more sets of image processing instruction stored in the memory, to cause the ADAS at least to:
determine non-consecutive image frames of the received image frames based on skipping one or more image frames of the image frames;
perform a coarse detection of one or more objects present in the determined non-consecutive image frames of the image frames;
determine one or more regions of interest, corresponding to the coarsely detected one or more objects, within each image frame of a predetermined number of neighboring frames based on a historical detection pattern of the coarsely detected one or more objects; and
upon detection of the presence of the one or more objects in the coarse detection and detection of the one or more regions of interests, perform a fine detection of the one or more objects by executing corresponding set of image processing instructions of the one or more objects in the detected one or more regions of interests present in at least one image frame of the predetermined number of neighboring image frames of an image frame in which the presence of the one or more objects is detected in the coarse detection.

10. The ADAS as claimed in claim 9, wherein the processing system comprises a mode controller for operating the processing system in one or more modes of a plurality of modes, wherein each of the plurality of modes corresponds to detection of objects of an object class of the one or more object classes.

11. The ADAS as claimed in claim 10, wherein the plurality of modes comprises a traffic sign detection mode, a traffic signal detection mode, and a road objects detection mode.

12. The ADAS as claimed in claim 10, wherein the processing system is configured to control the camera system to capture the image frames corresponding to the one or more modes in which the processing system operates.

13. The ADAS as claimed in claim 9, wherein the one or more object classes comprise:
objects related to traffic signal;
objects related to traffic sign; and
objects on a road on which the vehicle is driven.

14. A method, comprising:
by a processing system, facilitating receipt of image frames of at least a part of surroundings of a vehicle being driven; and
by the processing system, detecting presence of one or more objects while the vehicle is being driven by performing:
determining non-consecutive image frames of the received image frames based on skipping one or more image frames of the image frames;
performing a coarse detection of one or more objects present in the determined non-consecutive image frames of the image frames;
determining one or more regions of interest, corresponding to the coarsely detected one or more objects, within each image frame of a predetermined number of neighboring frames based on a historical detection pattern of the coarsely detected one or more objects; and
upon detection of the presence of the one or more objects in the coarse detection and detection of the one or more regions of interests, performing a fine detection of the one or more objects in the detected one or more regions of interests present in at least one image frame of the predetermined number of neighboring image frames of an image frame in which the presence of the one or more objects is detected in the coarse detection.

15. The method as claimed in claim 14, further comprising storing the image frames in a buffer at least for a predetermined time period.

16. The method as claimed in claim 14, wherein the one or more regions of interests are determined based on one or more regions in which the presence of the one or more objects is detected in the coarse detection.

17. The method as claimed in claim 14, wherein the performing the coarse detection comprises detecting at least one distinctive feature of the one or more objects.

18. An advanced driver assistance system (ADAS), comprising:
- a camera system for capturing image frames of at least a part of surroundings of a vehicle;
- a memory comprising image processing instructions; and
- a processing system communicably coupled to the camera system for receiving the image frames, the processing system configured, along with the image processing instructions stored in the memory, to cause the ADAS at least to:
    - determine non-consecutive image frames of the received image frames based on skipping one or more image frames of the image frames;
    - perform a coarse detection of one or more objects present in the determined non-consecutive image frames of the image frames;
    - upon detection of the presence of the one or more objects in the coarse detection, perform a fine detection of the one or more objects in at least a predetermined number of neighboring image frames of an image frame in which the presence of the one or more objects is detected in the coarse detection; and
    - upon detection of a speed sign in the fine detection, skip the coarse detection of a traffic light for a predetermined time period, the speed sign being an object of the one or more objects related to a traffic sign and the traffic light being an object of the one or more objects related to a traffic signal.

* * * * *